US012618934B2

(12) United States Patent
Aweya et al.

(10) Patent No.: US 12,618,934 B2
(45) Date of Patent: May 5, 2026

(54) METHODS AND SYSTEMS FOR VALIDATING LOCATIONS

(71) Applicants: Khalifa University of Science and Technology, Abu Dhabi (AE); British Telecommunications PLC, London (GB); Emirates Telecommunications Corporation, Abu-Dhabi (AE)

(72) Inventors: James Aweya, Abu Dhabi (AE); Nawaf Almoosa, Abu Dhabi (AE)

(73) Assignees: Khalifa University of Science and Technology, Abu Dhabi (AE); British Telecommunications PLC, London (GB); Emirates Telecommunications Corporation, Abu Dhabi (AE)

( * ) Notice: Subject to any disclaimer, the term of this patent is extended or adjusted under 35 U.S.C. 154(b) by 243 days.

(21) Appl. No.: 18/256,247

(22) PCT Filed: Dec. 7, 2020

(86) PCT No.: PCT/GB2020/053134
§ 371 (c)(1),
(2) Date: Jun. 7, 2023

(87) PCT Pub. No.: WO2022/123190
PCT Pub. Date: Jun. 16, 2022

(65) Prior Publication Data
US 2024/0118369 A1 Apr. 11, 2024

(51) Int. Cl.
G01S 5/02 (2010.01)
H04W 16/18 (2009.01)
H04W 64/00 (2009.01)

(52) U.S. Cl.
CPC .......... G01S 5/0242 (2013.01); G01S 5/0278 (2013.01); H04W 16/18 (2013.01); H04W 64/003 (2013.01)

(58) Field of Classification Search
CPC ...... G01S 5/0242; G01S 5/0278; G01S 5/021; G01S 5/14; H04W 16/18; H04W 64/003; H04W 4/33; H04W 84/12; H04B 17/27
See application file for complete search history.

(56) References Cited

U.S. PATENT DOCUMENTS

| | | | | |
|---|---|---|---|---|
| 8,880,105 | B2 * | 11/2014 | Aweya | G01S 5/02521 |
| | | | | 455/457 |
| 10,925,029 | B2 * | 2/2021 | Kuang | G01S 5/02527 |

(Continued)

OTHER PUBLICATIONS

Golden S A et al: "Sensor Measurements for Wi-Fi Location with Emphasis on Time-of-Arrival Ranging" IEEE Transactions on Mobile Computing, IEEE Service Center, Los Alamitos, CA, US, vol. 6, No. 10, Oct. 1, 2007, pp. 1185-1198.

(Continued)

*Primary Examiner* — Lester G Kincaid
(74) *Attorney, Agent, or Firm* — Calfee, Halter & Griswold LLP

(57) ABSTRACT

This invention relates to methods and systems for determining whether a reference point in a location system has changed used measurement residuals determined from an exchange of messages between reference points. In one embodiment a method of determining whether the location of a first one of a plurality of reference points used in a location system has changed is provided. The reference points each have a known initial position and the method includes the steps of: sending a wireless message between a second reference point and the first reference point and recording the times of sending and receipt of the wireless message; estimating, from the recorded times, an estimated distance between the first reference point and the second reference point; comparing the estimated distance to the actual distance between the known initial positions of the first and second reference points to determine a measure- (Continued)

ment residual; and determining, using the measurement residual, whether the location of the first reference point has changed.

26 Claims, 3 Drawing Sheets

(56) References Cited

U.S. PATENT DOCUMENTS

| | | | |
|---|---|---|---|
| 2003/0125046 A1 | 7/2003 | Wyatt | |
| 2006/0009235 A1 | 1/2006 | Leonid et al. | |
| 2010/0159958 A1* | 6/2010 | Naguib | G01S 5/021 |
| | | | 455/457 |
| 2016/0219410 A1* | 7/2016 | Singh | H04L 67/52 |
| 2016/0345289 A1* | 11/2016 | Mayor | H04W 64/003 |
| 2019/0357168 A1* | 11/2019 | Nie | H04W 4/029 |
| 2021/0306975 A1* | 9/2021 | Raghu | H04W 40/248 |

OTHER PUBLICATIONS

Ghari Pouya M et al: "Maximum Entropy-Based Semi-Definite Programming for Wireless Sensor Network Localization" IEEE Internet of Things Journal, IEEE, USA, vol. 6, No. 2, Apr. 1, 2019, pp. 3480-3491.

IEEE Standard for a Precision Clock Synchronization Protocol for Networked Measurement and Control Systems, IEEE 1588-2008.

C. E. Shannon, "A mathematical theory of communication," Bell Syst. Tech. J., vol. 27, pp. 379-423; 623-656, Jul./Oct. 1948.

J.F. Bercher, C. Vigant, "Estimating the entropy of a signal with applications", IEEE Trans. on Signal Processing, vol. 48, No. 6, pp. 1687-1694, Jun. 2000.

R. Moddemeijer, "On estimation of entropy and mutual information of continuous distributions," Signal Processing, vol. 16, No. 3, pp. 233-246, 1989.

P. Hall and S. Morton, "On the estimation of entropy," Ann. Inst. Stat. Math., vol. 45, pp. 69-88, 1993.

O. Vasicek, "A test of normality based on sample entropy," J. R. Stat. Soc. Ser. B, vol. 38, pp. 54-59, 1976.

J. C. Correa, "A new estimator of entropy," Commun. Stat.-Theory Methodol., vol. 24, pp. 2439-2449, 1995.

P. Viola, N. N. Schraudolph and T. J. Sejnowski, "Empirical entropy manipulation for real-world problems," in Advances in Neural Information Processing Systems 8. Cambridge, MA: MIT Press, 1996.

D. T. Pham, "Blind separation of instantaneous mixture of sources via an independent component analysis," IEEE Trans. Signal Processing, vol. 44, pp. 2768-2779, Nov. 1996.

S. Kay, "Model-based probability density function estimation," IEEE Signal Processing Letters, vol. 5, No. 12, Dec. 1998.

G. Kitagawa and W. Gersh, "A smoothness priors long AR model method for spectral estimation," IEEE Trans. Automat. Contrl., vol. AC-30, pp. 57-65, 1985.

J.F. Giovannelli, G. Demoment and A. Herment, "A Bayesian method for long AR spectra estimation: A Comparative study," IEEE Trans. Ultrason. Freq. Ferroelect., vol. 43, pp. 220-233, Mar. 1996.

M. H. Hayes, Statistical Digital Signal Processing and Modeling, John Wiley & Sons, Inc., 1996.

International Search Report and Written Opinion from PCT/GB2020/ 053134 dated Dec. 7, 2020.

* cited by examiner $(x_1, y_1)$ — Access Point 1
(AP1)

Access Point 2
(AP2) — $(x_2, y_2)$

AP2 is
Moved $(x'_2, y'_2)$ $(x_c, y_c)$
Client
(At Unknown
Location)

$(x_N, y_N)$ — Access Point N
(APN)

Access Point 3 — $(x_3, y_3)$
(AP3)

Access Point 1
(AP1)
$(x_1, y_1)$

Access Point 2
(AP2)
$(x_2, y_2)$ $t_1$ $t_2$ $(x_N, y_N)$ $t_N$ $t_3$     $(x_3, y_3)$ Access Point N
(APN)

Access Point 3
(AP3)

METHODS AND SYSTEMS FOR VALIDATING LOCATIONS

RELATED APPLICATIONS

This application claims priority to and all benefits of International Application No. PCT/GB2020/053134, filed on Dec. 7, 2020 for METHODS AND SYSTEMS FOR VALIDATING LOCATIONS, the entire disclosure of which is fully incorporated herein by reference.

FIELD OF THE INVENTION

The present invention relates to methods and systems for validating locations. It is particularly, but not exclusively, concerned with methods and systems for validating the location of access points, in particular reference access points in wireless networks such as WLANs.

BACKGROUND OF THE INVENTION

The Global Positioning System (GPS) is a widely available and almost indispensable service that provides location information used in many applications, such as navigation and emergency location services (e.g. E911). It is not hard to see that the applications of GPS and other similar Global Navigation Satellite Systems (GNSS) (for example the Russian GLONASS, the European Union's Galileo, and the Chinese Beidou) will continue to grow.

Although being a very useful and indispensable service, GPS, however, does have a number of limitations, particularly for indoor applications. GPS receivers typically do not work well or at all indoors because the weak signals that are transmitted from the satellites are blocked by the building structures the receiver are located in.

Furthermore, even in the outdoor environment, particularly in city centers with skyscrapers and very tall buildings, the satellite signals can be blocked by the surrounding environment because it obstructs the view between the GPS receiver and the geostationary satellites (so-called "urban canyons"). For these reasons and others, location techniques that can operate in the indoor environment (using, for example, wireless Local Area Network (WLAN) technologies) are sought after to complement the services provided by GPS.

Location systems based on WiFi (IEEE 802.11) are generating a lot of interest in the industry mainly due to the ubiquity of WiFi and its presence in almost all aspects of our daily lives (in schools, hospitals, shopping malls, offices, factories, airports, etc.). This has made the need for location systems based on WiFi a pressing issue and an active area of research both in the industry and academia. The indoor environment itself presents significant challenges to localization. The location system has to address very tough challenges like NLOS and multipath propagation errors to provide accurate location estimates.

Similar to GPS, there are numerous applications for indoor location systems (i.e., location based services). Some applications include indoor navigation, location-based security, printer finding based on one's location, location-based information access and sharing, people tracking, asset tracking and management, and location-based games.

Indoor location can also be combined with a Radio Frequency Identification (RFID) reader and asset tagging to achieve some of the applications above. The location of an RFID reader can be determined and the reader in turn can be used to scan RFID tags. For example, in automated inventory systems, the automatically located wireless RFID reader records into the inventory database any tag that it scans. The location system infers the location of an RFID tag by estimating the location of the reader and makes entries into the database the items it scans.

The most common localization techniques are Receiver Signal Strength Indicator (RSSI), Time Difference of Arrival (TDOA), Time of Arrival (TOA), and Angle of Arrival (AOA). All these techniques have two main components, a measurement block and a location computation block. The measurement block performs the functions of: measuring distance from signal power loss between a transmitter and receiver in RSSI; measuring distance between a transmitter and receiver using a two-way ranging protocol or time synchronized transmitter and receiver in TOA; measuring time/range differences between a number of receivers receiving a signal sent from a transmitter in TDOA; or measuring angle of arrival of a signal at a receiver sent from a transmitter in AOA. The location computation block uses the measurement block data to obtain a location estimate.

The positions of the reference points used in the location estimates of clients is a key requirement in location systems and has to be known at all times the system is operational.

This is because accurate localization depends heavily on how accurate the positions of the reference points are known. Errors due to inaccurate recording of the positions of the reference points translate directly into an error in the location estimates. This error is an additional error on top of the other sources of error such as NLOS and multipath propagation errors, as well as computational errors that may occur in the location computation algorithm.

The location computation algorithm is the component in the location system that computes the location of the client when given the raw input measurements such as ranges (in TOA), range differences (in TDOA), angles (in AOA), etc. Even if these input measurements are accurate, errors in the positions of the reference points will render the client location estimate inaccurate. Regardless of whether the positions are absolute or relative to another reference (e.g., GPS), they have to be accurate to be meaningful in the location computation.

Particularly, in location systems that use WiFi access points (APs), there is no guarantee that a technician would not unintentionally move the AP when carrying out maintenance or repair works. This is illustrated schematically in FIG. 1 where one access point (AP2) has been moved from known location $(x_2, y_2)$ to a new location $$(x_2', y_2').$$

An accurate location system will require that all moves be known and the new locations of the reference points be accurately determined and the location records updated.

However, it is not safe to operate under the assumption that all AP moves will be known and recorded. Therefore the location system cannot simply take the recorded locations of the reference points as the absolute truth because a technician might assume that moving the position by 3 meters, for example, will not adversely affect system operations, or might be unaware that a location system is reliant on the positioning of the AP.

An object of the present invention is to address the above problems by providing techniques for validating the location of the reference points.

SUMMARY OF THE INVENTION

An exemplary embodiment of the invention provides a method of determining whether the location of a first one of a plurality of reference points used in a location system has changed, the reference points each having a known initial position, the method including the steps of: sending a wireless message between a second reference point and the first reference point and recording the times of sending and receipt of the wireless message; estimating, from the recorded times, an estimated distance between the first reference point and the second reference point; comparing the estimated distance to the actual distance between the known initial positions of the first and second reference points to determine a measurement residual; and determining, using the measurement residual, whether the location of the first reference point has changed.

A further exemplary embodiment of the invention provides a method of determining the location of a mobile device, the method including the mobile device exchanging wireless messages with a plurality of reference points having known initial positions and determining the location of the mobile device from the timing of the sending and receiving of said messages, wherein the method further includes determining whether the location of any of the reference points has changed using a method according to the above exemplary embodiment.

A further exemplary embodiment of the invention provides a location system having a plurality of reference points each having a known initial position and arranged to exchange wireless messages with a mobile device to determine the location of the mobile device, the system including a processor which is arranged to: estimate from the recorded times of sending and receipt of a wireless message between a second reference point and a first reference point, an estimated distance between the first reference point and the second reference point; compare the estimated distance to the actual distance between the known initial positions of the first and second reference points to determine a measurement residual; and determine, using the measurement residual, whether the location of the first reference point has changed.

BRIEF DESCRIPTION OF THE DRAWINGS

Embodiments of the invention will now be described by way of example with reference to the accompanying drawings in which.

DETAILED DESCRIPTION

Figure 1:
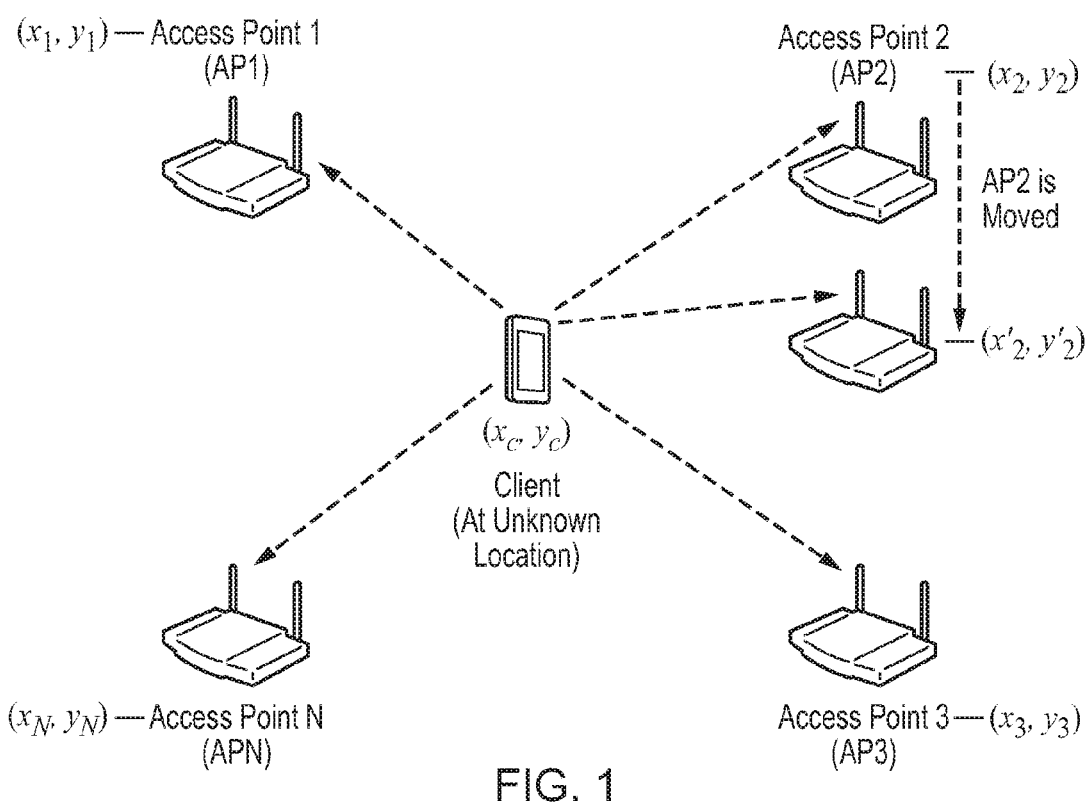
FIG. 1 shows a typical wireless network and illustrates the effect of unintentional relocation of an access point.

At their broadest, aspects of the present invention provide for methods and systems for determining whether a reference point in a location system has changed using measurement residuals determined from an exchange of messages between reference points.

A first aspect of the present invention provides a method of determining whether the location of a first one of a plurality of reference points used in a location system has changed, the reference points each having a known initial position, the method including the steps of: sending a wireless message between a second reference point and the first reference point and recording the times of sending and receipt of the wireless message; estimating, from the recorded times, an estimated distance between the first reference point and the second reference point; comparing the estimated distance to the actual distance between the known initial positions of the first and second reference points to determine a measurement residual; and determining, using the measurement residual, whether the location of the first reference point has changed.

Thus the method of this aspect can provide an approach validating the location of the reference points used in the location system. These reference points may be wireless access points. The validation can be performed periodically (whilst the location system is operational), for example, once per day and at system startup.

The method of this aspect can be used in a time-based location system such as TOA or TDOA in which accurate synchronization of the reference points is an important requirement.

The provision of a reference point validation scheme may also enable location-based services (such as life-saving services like E911) to operate with high certainty that the reference points locations are not a source of errors in location estimates.

The method can use a validity metric for validating the location of reference points based on the measurement residuals. This validity metric can be used to check if a reference point has accidentally been moved in the location system. Reference points that are found to have invalid locations are not used in the subsequent estimation of client locations in the location system.

The steps of sending, estimating and comparing may be performed a plurality of times and the step of determining may use all of the determined measurement residuals. This can ensure that outlier errors in a single measurement do not disrupt the system. In certain arrangements an average of the determined measurement residuals can be used.

In certain embodiments the step of determining includes comparing the measurement residual or residuals to a pre-determined measurement residual for a message sent between the first and second reference points when they are at their initial positions.

The location of the first reference point may be determined to have changed if the measurement residual or residuals differs from the pre-determined measurement residual by more than a pre-determined amount. This can allow a tolerance to account for measurement residuals caused by the environment and natural variations, for example due to NLOS and multipath propagation errors.

The step of determining may include comparing the average of the determined measurement residuals to an average of a plurality of pre-determined measurement residuals for a plurality of messages sent between the first and second reference points when they are at their initial positions. This can provide a baseline of measurement residuals which reflects the environment around the reference point(s) and/or natural variations in the sending and receipt of signals.

The method may further include the steps of: sending a wireless message between a plurality of other reference points and the first reference point and recording the times of sending and receipt of the wireless message; and for each of the plurality of other reference points: estimating, from the recorded times, an estimated distance between the first reference point and the other reference point; and comparing the estimated distance to the actual distance between the known initial positions of the first reference point and the other reference point to determine a measurement residual, wherein the step of determining uses all of the determined measurement residuals.

Thus the method can be expanded to make use of the expected distances between the first reference point and a plurality of other reference points, thereby increasing the accuracy of the determination (by, for example, being able to identify situations in which the first reference point has moved to a position that is substantially the same distance from the second reference point as its initial location, but which is a different distance from one or more other reference points than its initial location.

In certain embodiments, the step of determining includes estimating the entropy of the measurement residual or residuals.

Entropy is a measure of the uncertainty or unpredictability associated with a signal and the concepts can be adapted to develop suitable metrics for validation of the location of the reference points.

The method may further include the step of estimating the entropy of a plurality of pre-determined measurement residuals for a plurality of messages sent between the first and second reference points when they are at their initial positions.

The location of the first reference point may be determined to have changed if the entropy of the measurement residual or residuals differs from the entropy of the plurality pre-determined measurement residuals by more than a pre-determined amount.

The entropy may be estimated using a probability density function (PDF). The estimation may be performed using an autoregressive model and/or by use of a recursive approach.

Preferably the steps of the method are performed with each of the plurality of reference points as the first reference point so that the location of each reference point can be checked.

The method of the present aspect may include any combination of some, all or none of the above described preferred and optional features.

The method of the above aspect is preferably implemented by a system according to the third aspect of this invention, as described below, but need not be.

Further aspects of the present invention include computer programs for running on computer systems which carry out the method of the above aspect, including some, all or none of the preferred and optional features of that aspect.

A second aspect of the present invention provides a method of determining the location of a mobile device, the method including the mobile device exchanging wireless messages with a plurality of reference points having known initial positions and determining the location of the mobile device from the timing of the sending and receiving of said messages, wherein the method further includes determining whether the location of any of the reference points has changed using a method according to the above-described first aspect, including some, all or none of the optional or preferred features of that aspect.

Preferably, when determining the location of the mobile device, the method of this aspect does not use any reference point whose location is determined to have changed. This means that the determined location of the mobile device can be prevented from being influenced by reference points that are determined to have moved from their initial position and errors in the determined location can be reduced or avoided.

A third aspect of the present invention provides a location system having a plurality of reference points each having a known initial position and arranged to exchange wireless messages with a mobile device to determine the location of the mobile device, the system including a processor which is arranged to: estimate from the recorded times of sending and receipt of a wireless message between a second reference point and a first reference point, an estimated distance between the first reference point and the second reference point; compare the estimated distance to the actual distance between the known initial positions of the first and second reference points to determine a measurement residual; and determine, using the measurement residual, whether the location of the first reference point has changed.

Thus the location system of this aspect can validate the location of the reference points used in the location system. These reference points may be wireless access points. The validation can be performed periodically (whilst the location system is operational), for example, once per day and at system startup.

The location system may be a time-based location system such as TOA or TDOA in which accurate synchronization of the reference points is an important requirement.

The provision of a reference point validation scheme may also enable location-based services (such as life-saving services like E911) to operate with high certainty that the reference points locations are not a source of errors in location estimates.

The location system can use a validity metric for validating the location of reference points based on the measurement residuals. This validity metric can be used to check if a reference point has accidentally been moved in the location system.

The system may be arranged such that reference points that are found to have invalid locations are not used in the subsequent estimation or determination of client locations in the location system.

The processor may be arranged to perform the steps of estimating and comparing a plurality of times and to use all of the determined measurement residuals in determining whether the location of the first reference point has changed. This can ensure that outlier errors in a single measurement do not disrupt the system. In certain arrangements an average of the determined measurement residuals can be used.

In certain embodiments the processor is arranged to determine whether the location of the first reference point has changed using an average of the determined measurement residuals.

The processor may be arranged to determine whether the location of the first reference point has changed by comparing the measurement residual or residuals to a pre-determined measurement residual for a message sent between the first and second reference points when they are at their initial positions.

The processor may be arranged to determine that the location of the first reference point if the measurement residual or residuals differs from the pre-determined measurement residual by more than a pre-determined amount. This can allow a tolerance to account for measurement residuals caused by the environment and natural variations, for example due to NLOS and multipath propagation errors.

The processor may be arranged to determine whether the location of the first reference point has changed by comparing the average of the determined measurement residuals to an average of a plurality of pre-determined measurement residuals for a plurality of messages sent between the first and second reference points when they are at their initial positions.

This can provide a baseline of measurement residuals which reflects the environment around the reference point(s) and/or natural variations in the sending and receipt of signals.

The processor may be further arranged to: for each of a plurality of other reference points in the system: estimate, from the recorded times of sending and receipt of wireless messages sent between the other reference point and the first reference point, an estimated distance between the first reference point and the other reference point; compare the estimated distance to the actual distance between the known initial positions of the first reference point and the other reference point to determine a measurement residual, and to determine whether the location of the first reference point has changed using all of the determined measurement residuals.

Thus the validation approach in the location system can be expanded to make use of the expected distances between the first reference point and a plurality of other reference points, thereby increasing the accuracy of the determination (by, for example, being able to identify situations in which the first reference point has moved to a position that is substantially the same distance from the second reference point as its initial location, but which is a different distance from one or more other reference points than its initial location.

In certain embodiments, the processor may be arranged to estimate the entropy of the measurement residual or residuals and to determine whether the location of the first reference point has changed using said estimated entropy.

Entropy is a measure of the uncertainty or unpredictability associated with a signal and the concepts can be adapted to develop suitable metrics for validation of the location of the reference points.

The processor may be arranged to estimate the entropy of a plurality of pre-determined measurement residuals for a plurality of messages sent between the first and second reference points when they are at their initial positions.

The location of the first reference point may be determined to have changed if the entropy of the measurement residual or residuals differs from the entropy of the plurality pre-determined measurement residuals by more than a pre-determined amount.

The entropy may be estimated using a probability density function (PDF). The estimation may be performed using an autoregressive model and/or by use of a recursive approach.

Preferably the steps performed by the processor are carried out with each of the plurality of reference points as the first reference point so that the location of each reference point can be checked.

The location system may have a single processor which is arranged to determine, from wireless messages sent and received by a plurality of said reference points, whether the location of any of said plurality of reference points have changed by performing the steps of estimating, comparing and determining for each of said plurality of reference points.

The single processor may be located in one of the reference points or in a dedicated (but separate) location management station.

Alternatively or additionally each reference point may have a processor which is arranged to determine, from the measurement residuals determined for messages sent by or received by that reference point, whether the location of that reference point has changed.

One of the reference points in the location system may have a position which is guaranteed to be known at all times. This reference point may be known as an anchor reference point.

The positions of all the other reference points may be estimated relative to this anchor reference point.

The location system may be sub-divided into a plurality of domains, each having a subset of the reference points in the overall location system. The determination of whether a reference point has moved from its initial location may be performed within each domain. This can simplify the complexity of the location system and the measurements and calculations.

The location system of the present aspect may include any combination of some, all or none of the above described preferred and optional features.

Embodiments of the present invention which can be used to validate the positions of the reference points (which can be APs in a WiFi networking context) will now be described. A first technique is based on averaging of measurement residuals, while the second is based on the entropy estimate of the measurement residuals. The skilled person will appreciate that these two techniques are by no means the only solutions can be used, but are provided to illustrate how the validation can be done.

For both techniques, it is assumed that there are N reference APs located at known positions $(x_i, y_i)$, i=1, 2, . . ., N, in a Cartesian coordinate system. This view can easily be extended to the 3-dimensional case without loss of generality. As required in TDOA localization, for example, all these APs can be time synchronized to a common reference clock using a protocol such as IEEE 1588v2 Precision Timing Protocol (PTP) [1] or directly to a GPS reference.

To allow for accurate localization, it is assumed that each AP implements nanosecond level timestamping of messages in its transmit (Tx) and receive (Rx) directions, as typically done in PTP devices. For example, timestamping in the 4 ns up to 8 ns level is typically used in PTP devices. However, the smaller the timestamping resolution, the finer the resolution of the TDOA values used in the location estimates.

It is further assumed that the APs exchange messages and AP to AP messaging, for example, can be done using WiFi beacon frames. In this case, the APs can take turns in sending beacons to other APs. For simplicity, it is assumed that each AP receives messages from all other APs in the system. In reality, practical constraints such as signal reachability between APs, channel allocation, and other issues have to be considered when designing the location system network.

Each message sent from an AP has an originator identifier (ID) and a sequence number. To simplify the architecture of the APs, the AP location validation is assumed to be done at a centralized location management station. This means that, all information required for the location validation is sent to the location management station for processing. However, it will be appreciated that the location validation processing can be done in a distributed fashion, for example by any or all of the APs themselves.

Concept of Measurement Residuals

Figure 2:
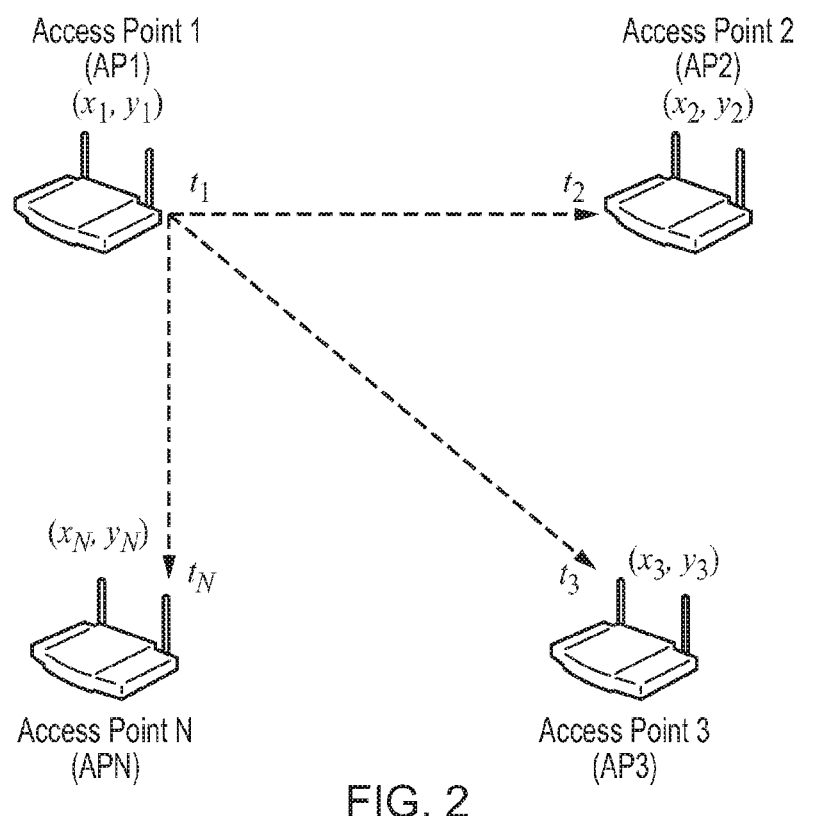
FIG. 2 illustrates the general principle of distance ranging between access points.

FIG. 2 shows, schematically, an arrangement of access points forming part of a network of N such access points as described above. The APs generate timestamps $t_i$ and $t_j$, with $t_i$ denoting the departure time of a message sent from $AP_i$ and $t_j$ denoting as the arrival time of the same message at $AP_j$. The timestamps are generated at the nanosecond level in the APs as done in PTP devices using hardware-based time-stamping techniques. The clocks used in generating $t_i$ and $t_1$ are synchronized to a common reference clock.

With $t_i$ and $t_j$ corresponding to a particular message with a sequence number, the time-of-flight (ToF) or travel time of the message from $AP_i$ to $AP_j$ is computed as $$\text{ToF}_{ij}=t_j-t_i;\ i,j=1,2,\ldots,N;i{\neq}j \tag{1}$$

The $\text{ToF}_{ij}$ values are affected by any NLOS and multipath propagation errors on the path between $AP_i$ and $AP_j$. The $\text{ToF}_{ij}$ can be computed at $AP_j$ and then sent, along with its corresponding $AP_i$ and $AP_j$ IDs and message sequence number, to the location management station. Alternatively, the raw data, i.e. $t_i$ and $t_j$(plus $AP_i$ and $AP_j$ IDs and message sequence number) can be sent to the management station for the $\text{ToF}_{ij}$ to be computed there.

Using the $\text{ToF}_{ij}$, the measured distance between $AP_i$ and $AP_j$ can be computed as $$m_{ij}=c{\cdot}\text{ToF}=c(t_j-t_i);i,j=1,2,\ldots,N;i{\neq}j, \tag{2}$$

where c is the speed of light. The measured distance $m_{ij}$ includes errors which are due to NLOS and multipath propagation errors and other impairments on the path.

Given that the APs are assigned known positions, $(x_i, y_i)$, i=1, 2, . . . , N, as required by the location system, the actual physical (geographic) distance between any two APs, $AP_i$ and $AP_j$, is given by $$r_{ij}=\sqrt{(x_i-x_j)^2+(y_i-y_j)^2};i,j=1,2,\ldots,N;i{\neq}j \tag{3}$$

Using the actual distance $r_{ij}$ and the measured distance $m_{ij}$, the measurement residual $\beta_{ij}$ can be defined as $$\beta_{ij}=m_{ij}-r_{ij};i,j=1,2,\ldots,N;i{\neq}j \tag{4}$$

The measurement residuals $\beta_{ij}$ are each due to the NLOS and multipath propagation errors (and other path impairments) on the path.

The measurement residuals at the initial location system setup phase (after the APs have been assigned accurately known locations $(x_i,y_i)$) can be denoted as $$\varepsilon_{ij}=\beta_{ij};\ i,j=1,2,\ldots,N;\ i{\neq}j \tag{5}$$

Similarly, the measurement residual during the system operations phase where the APs locations are validated can be denoted as $$\gamma_{ij}=\beta_{ij};\ i,j=1,2,\ldots,N;\ i{\neq}j \tag{6}$$

Note that the measurement residuals $\varepsilon_{ij}$ and $\varepsilon_{ji}$ (or $\gamma_{ij}$ and $\gamma_{ji}$) for i≠j, are not necessarily equal. This is because in the wireless environment, the signal path characteristics from $AP_i$ to $AP_j$ are not necessarily identical to those from $AP_j$ to $AP_i$.

Location Validation Using Averaging of Measurement Residuals

A first embodiment of the present invention uses the averages of the measurement residuals to develop a validity metric that can be used for the AP location validation. The validation process is split into two phases; an initial system setup phase, and system operations phase.

Initial System Setup Phase

After system setup and when the AP locations are precisely known and recorded, each AP, $AP_i$ generates a sequence of measurement residuals $\varepsilon_{ij}$ with respect to $AP_j$ to obtain the corresponding vector $E_{ij}$. The elements of this vector of residuals $E_{ij}$ for each pair of APs, $AP_i$ and $AP_j$, are averaged to obtain $\hat{\varepsilon}_{ij}$ which is a representative measurement residual for $AP_i$ and $AP_j$.

Then a matrix of measurement residuals $\overline{M}_\varepsilon$ is generated and maintained at the location management station as follows:

$$\overline{M}_\varepsilon = \begin{bmatrix} 0 & \hat{\varepsilon}_{12} & \hat{\varepsilon}_{13} & \ldots & \hat{\varepsilon}_{1N} \\ \hat{\varepsilon}_{21} & 0 & \hat{\varepsilon}_{23} & \ldots & \hat{\varepsilon}_{2N} \\ \hat{\varepsilon}_{31} & \hat{\varepsilon}_{32} & 0 & \ldots & \hat{\varepsilon}_{34} \\ \vdots & \vdots & \vdots & \ddots & \vdots \\ \hat{\varepsilon}_{N1} & \hat{\varepsilon}_{N2} & \hat{\varepsilon}_{N3} & \ldots & 0 \end{bmatrix}; i \neq j; \hat{\varepsilon}_{ii} = 0 \tag{7}$$

In the matrix $\overline{M}_\varepsilon$, the entries for i=j are invalid or are set to zero.

System Operations Phase

The system operations phase is when the system is up and running and the location of an AP has to be checked periodically to determine if it has been accidentally moved from its known/assigned position $(x_i,y_i)$. Periodically, for example, once a day, a vector $G_{ij}$ of measurement residuals $\gamma_{ij}$ is captured for each pair of APs, $A_i$ and $AP_j$. The elements of each vector $G_{ij}$ are averaged to obtain a representative measurement residual $\hat{\gamma}_{ij}$ for $AP_i$ and $AP_j$.

Then an online matrix $\overline{M}_\gamma$ is generated at the location management station from the $\hat{\gamma}_{ij}$ values for the particular operational time instant as follows:

$$\overline{M}_\gamma = \begin{bmatrix} 0 & \hat{\gamma}_{12} & \hat{\gamma}_{13} & \ldots & \hat{\gamma}_{1N} \\ \hat{\gamma}_{21} & 0 & \hat{\gamma}_{23} & \ldots & \hat{\gamma}_{2N} \\ \hat{\gamma}_{31} & \hat{\gamma}_{32} & 0 & \ldots & \hat{\gamma}_{3N} \\ \vdots & \vdots & \vdots & \ddots & \vdots \\ \hat{\gamma}_{N1} & \hat{\gamma}_{N2} & \hat{\gamma}_{N3} & \ldots & 0 \end{bmatrix}; i \neq j; \hat{\gamma}_{ii} = 0 \tag{8}$$

Similarly, in the matrix $\overline{M}_\gamma$, the entries for i=j are invalid or are set to zero.

Validation of AP Location

The elements of the matrices $\overline{M}_\varepsilon$ and $\overline{M}_\gamma 0$ are compared to determine if any AP has been moved from its desired position. If it is determined that an AP has been accidentally moved then the system can be adjusted so that that AP is not used in the localization of clients until its new location has been verified and updated in the location system records. In addition, the new position has to be accurately determined to avoid introducing errors in the location estimates of clients.

Some simple metrics that can be used for determining if a particular AP, $AP_{i=a}$, has been moved are as follows:

$$\hat{\varepsilon}_{metric,i=a} = \frac{\sum_{i=1}^{N}\hat{\varepsilon}_{ai} + \sum_{j=1}^{N}\hat{\varepsilon}_{aj}}{2} \tag{9}$$

$$\hat{\gamma}_{metric,i=a} = \frac{\sum_{i=1}^{N}\hat{\gamma}_{ai} + \sum_{j=1}^{N}\hat{\gamma}_{aj}}{2} \tag{10}$$

Figure 3:
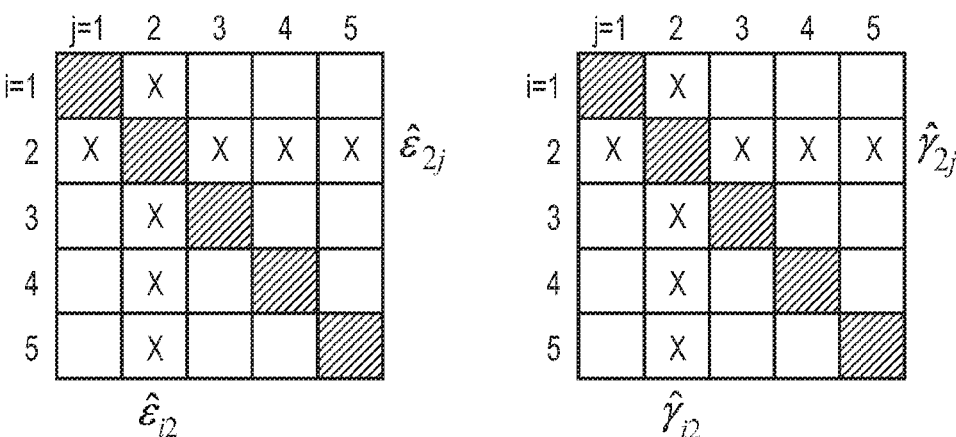
FIG. 3 illustrates how matrices of measurement residuals may be affected by unintentional relocation of access points.

The affected rows and columns for matrices $\overline{M}_\varepsilon$ and $\overline{M}_\gamma$ are illustrated in FIG. 3 for $AP_{i=2}$ (N=5), as an example.

From the metrics defined above, the following validity metric can be defined:

If $|\hat{\gamma}_{metric,i=a}-\hat{\varepsilon}_{metric,i=a}|{\geq}\mu$, then the position of $AP_{i=a}$ $(x_a,y_a)$ has changed $\qquad\qquad (11)$

11

The tolerance μ can be chosen to account for the maximum possible measurement residual ($\max\{\varepsilon_{ij}\}$ and $\max\{\varepsilon_{ji}\}$, due to NLOS and multipath propagation errors), that can occur at the initial system setup phase (when all APs are known to be at their exact assigned locations). For example, if $\max\{\varepsilon_{ij}\}$ or max $\{\varepsilon_{ji}\}$ is 2 meters, then p could be set to 2 meters. This means that, if $|\hat{\gamma}_{metric,i=a} - \hat{\varepsilon}_{metric,i=a}| \geq 2$, then it can be inferred that $AP_{i=a}$ has been moved from its assigned location $(x_a, y_a)$.

An $AP_i$ that has been moved from $(x_i, y_i)$ to $(x_i + \Delta x_i, y_i + \Delta y_i)$ will have a different measurement residual $\gamma_{ij}$ (or $\gamma_{ji}$) from the $\varepsilon_{ij}$ (or $\varepsilon_{ji}$) values (determined at the initial system setup phase).

In the system operations phase, only APs with valid locations are used in the localization of clients. The initial matrix $\overline{M}_\varepsilon$ can also be updated when there are major structural changes in the environment, such as addition/removal of walls, partitions, panels, cubicles, cabinets, etc. Other validity metrics can also be developed using the measurement residuals as explained next.

Location Validation Using Entropy Estimate of the Measurement Residuals

The entropy (or Shannon entropy) [2] of a signal, is defined as a measure of the uncertainty (or unpredictability) associated with the signal, which is also equivalent to the expected (or average) value of the information contained in the signal. In this embodiment, this well-known information theory concept is used to develop metrics that can be used to validate the location of APs in the location system.

AP Validation Architecture

The technique in the embodiment described above has N×N AP-to-AP ranging, storage, and computational complexity. Furthermore, the issue of AP-to-AP reachability and communication can be a problem in a large location system network where some APs may not be able to communicate with other APs. Channel assignment to the various APs may also be an issue.

Figure 4:
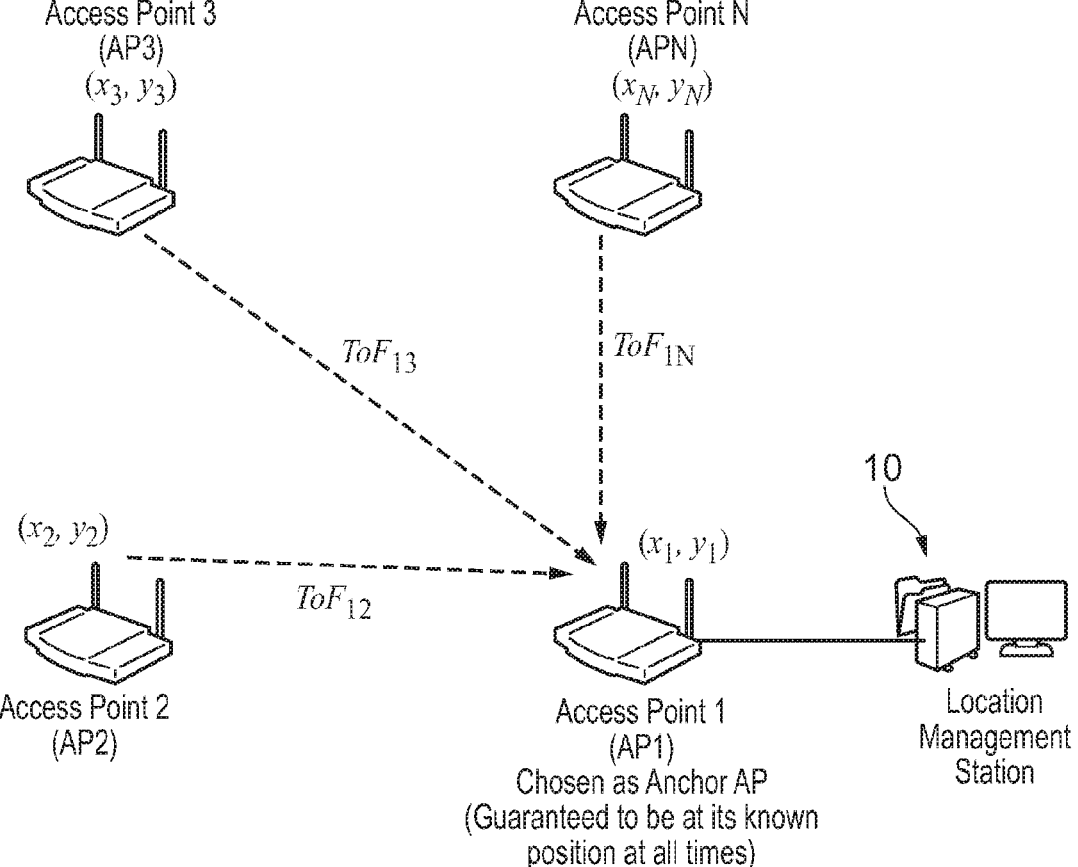
FIG. 4 shows a wireless network with an anchor access point.

To help address these problems, the network can be partitioned into smaller manageable domains, and an anchor AP selected for each domain. One AP ($AP_1$) is selected as the anchor AP for a domain. All other APs, $AP_j$, j≠1, perform ranging to this anchor AP, $AP_1$ as shown in FIG. 4. The anchor AP is preferably an AP that is guaranteed to be at its known location at all times the location system is operational. By selecting an anchor AP, the complexity of the location system is greatly reduced. The APs within the domain of the anchor AP must be able to communicate with it. There can be one or more domains in a location system network, each assigned an anchor AP. The anchor AP may be connected to a location management station 10.

The measurement residuals $\varepsilon_{1j}$ and $\gamma_{1j}$, j≠1, are calculated with respect to the anchor AP, $AP_1$, as illustrated in FIG. 4. The $\varepsilon_{1j}$ residuals are taken at initial system setup phase and the $\gamma_{1j}$ residuals during system operations phase as described above. Thus it can be seen that the architecture in FIG. 4 is essentially a simplified version of that in FIG. 2 with fewer APs. The AP-to-AP ranging operation remains essentially unchanged.

The architecture in FIG. 4 is used as the framework in which the AP location validation using entropy estimates is done purely for simplicity as explained above. The entropy estimates are obtained from vectors generated from $\varepsilon_{1j}$ values (denoted as vector $E_{1j}$) and $\gamma_{1j}$ values (denoted as vector $G_{1j}$). It will be appreciated that the techniques and approaches set out below can be applied to larger domains and even to a whole network.

12

Entropy Estimation of Signals

From information theory, the (Shannon) entropy of a random variable X X is defined as [2]

$$H(X) = -E_X[\log_2 p_X] = \int_{-\infty}^{\infty} p_X(x) \log_2 p_X(x) dx \qquad (12)$$

where $p_X(x)$ is the probability density function (PDF) of X. In most practical applications, the direct evaluation of (12) is difficult because it is not easy to compute or estimate the entropy from real data. Typically, most methods rely on estimating the PDF through histograms [4, 5], order statistics [6, 7] or kernel methods [8, 9]. Reference [3]proposed a more practical and efficient (alternative) technique to estimate the entropy of a random signal. This technique computes an estimate of entropy by estimating the PDF of the random variable. The technique takes advantage of the key findings in [3, 10] that the PDF of a random variable X can be estimated simply by appealing to the theory of Power Spectral Density (PSD) estimation. An estimate of the PDF $\hat{p}_X(x)$ can be parameterized by a set of coefficients $\{a_k\}$ of an autoregressive (AR) model in the form of a PSD $S_W(x)$, where $1 \leq k \leq p$ is the number of parameters [3, 10]

$$\hat{p}_X(x) = S_W(x) = \frac{\sigma_W^2}{\left|1 - \sum_{k=1}^{p} a_k e^{-j2\pi kx}\right|^2} \qquad (13)$$

where $$\sigma_W^2$$

is selected such that $$\int_{-1/2}^{+1/2} S_W(f) df = 1$$

since PSDs are different from PDFs in that they do not usually integrate to 1. Imposing the bound [−½, ½] ensures that the random variable is constrained between these values, since a general PDF is not periodic with period one as is imposed by the AR model [10]. This can be easily achieved by normalizing the data by $k\sigma_W$ where $\sigma_W$ is the standard deviation and k is a suitable parameter [10].

To clarify why the modeling of the PDF can be done using a PSD, it is noted that if $X(\omega,n)$ is a random process then we can find a process $W(\omega,n)$ that has a PSD that matches $p_X(x)$. One such process is $W(\omega,n) = e^{j(nX + \varphi(\omega))}$ where $\varphi(\omega)$ is uniformly distributed over $[0,2\pi]$ and independent of X [3]. It can be easily shown that the autocorrelation of W, $R_W(k)$, is the first characteristic function of X. The relationship between the PDF and the PSD can then be highlighted through the following Fourier Transform relationships $$R_W(k) \xrightarrow{F} S_W(x) \qquad (14)$$

$$\phi_x(k) \xrightarrow{F} P_X(x). \qquad (15)$$

From this it can be seen that if the autocorrelation $R_W(k)$ is equal to the $\phi_x(k)$ then $p_X(x)=S_W(x)$. As a result, to estimate the PDF $\hat{p}_X(x)$, an AR model of the form in (13) can be found. The parameterization in (13) is possible since a large enough model order can be shown to be capable of modeling any PDF in the $\|\cdot\|_\infty$ sense [3]. In order to estimate the model parameters in (13) based on available data $\{x_1, x_2, \ldots, x_N\}$, it is well known that the Yule-Walker equations relate the AR model parameters to the autocorrelation function [11].

The autocorrelation function in this case is the samples of the characteristic function given by [10]

$$F^{-1}\{p_X(x)\}=\phi_x(k)=E[e^{j2\pi xk}]=R_W(k) \tag{16}$$

where $\phi_x(k)$ is the characteristic function and $R_W(k)$ is the autocorrelation function of the underlying process W related to the PSD $S_W(x)$. The autocorrelation function essentially becomes samples of the characteristic function, and so $\phi_x(k)$ and $R_W(k)$ will be used interchangeably herein and they both refer to (17) below. To estimate the AR model parameters (and ultimately estimate the PDF), the autocorrelation of the random process is estimated which can be given by the sample moment estimator $$\hat{R}_W(k) = \frac{1}{N_s}\sum_{n=0}^{N_s-1} e^{j2\pi kx(n)} \tag{17}$$

where $k=0, \ldots, p$ and $N_s$ is the number of samples in the data vector. The AR model parameters can then be determined by solving the Yule-Walker equations [10, 11]

$$\hat{R}_W\hat{a} = \hat{r}_W \tag{18}$$

$$\begin{bmatrix} \hat{R}_W(0) & \hat{R}_W(-1) & \ldots & \hat{\ }(p-1)) \\ \hat{R}_W(1) & \hat{R}_W(0) & \ldots & \hat{\ }(p-2)) \\ \vdots & \vdots & \ddots & \vdots \\ \hat{R}_W(p-1) & \hat{R}_W(p-2) & \ldots & {}_W(0) \end{bmatrix}\begin{bmatrix} \hat{a}(1) \\ \hat{a}(2) \\ \vdots \\ \hat{a}(p) \end{bmatrix} = \begin{bmatrix} \hat{R}_W(1) \\ \hat{R}_W(2) \\ \vdots \\ \hat{R}_W(p) \end{bmatrix} \tag{19}$$

using the Levinson-Durbin recursion. An estimate of $$\hat{\sigma}_W^2$$

can be computed (once $\hat{a}_k$ are estimated) using $$\hat{\sigma}_W^2 = \hat{R}_W(0) - \sum_{k=1}^{p}\hat{a}(k)\hat{R}_W(-k) \tag{20}$$

which can also be computed using the Levinson-Durbin recursion.

Once the AR parameters of the PSD that models the PDF are computed then the estimate of entropy can be computed by $$\hat{H} = \int_{-1/2}^{1/2} \hat{p}_X(x)\log_2 \hat{p}_X(x)dx = \int_{-1/2}^{1/2} S_W(x)\log_2 S_W(x)dx \tag{21}$$

A more relevant/practical expression can be obtained applying Plancherel-Parseval formula to the right-hand side of (21) [3] which yields $$\hat{H} = -\sum_{k=-\infty}^{\infty} R_W(k)C_W^*(k) \tag{22}$$

where $R_W(k)$ is the $k^{th}$ correlation coefficient and $C_W(k)=FT^{-1}\{\log_2 S_W(x)\}$ is the $k^{th}$ component of its cepstrum [11]. Since $S_W(x)$ is real, both $R_W(k)$ and $$C_W^*(k)$$

have Hermitian symmetry and thus (22) can be expressed as $$\hat{H} = -2\,\text{Re}\left\{\sum_{k=0}^{\infty}R_W(k)C_W^*(k)\right\}. \tag{23}$$

Both $R_W(k)$ and $$C_W^*(k)$$

can be computed recursively as $$R_W(k) = \sum_{i=1}^{p}a_iR_W(k-i) + \sigma_W^2\delta(k) \tag{24}$$

$$C_W(k) = \begin{cases} \log\sigma_W^2, & \text{if } k = 0 \\ h(k) - \sum_{i=1}^{k-1}\left(\frac{i}{k}\right)C_W(i)h(k-i), & \text{if } k > 0 \end{cases} \tag{25}$$

where $h(k)$ is the impulse response of the AR system and which in turn can be computed recursively as $$h(k) = \sum_{i=1}^{p}a_ih(k-i) + \delta(k) \tag{26}$$

Figure 5:
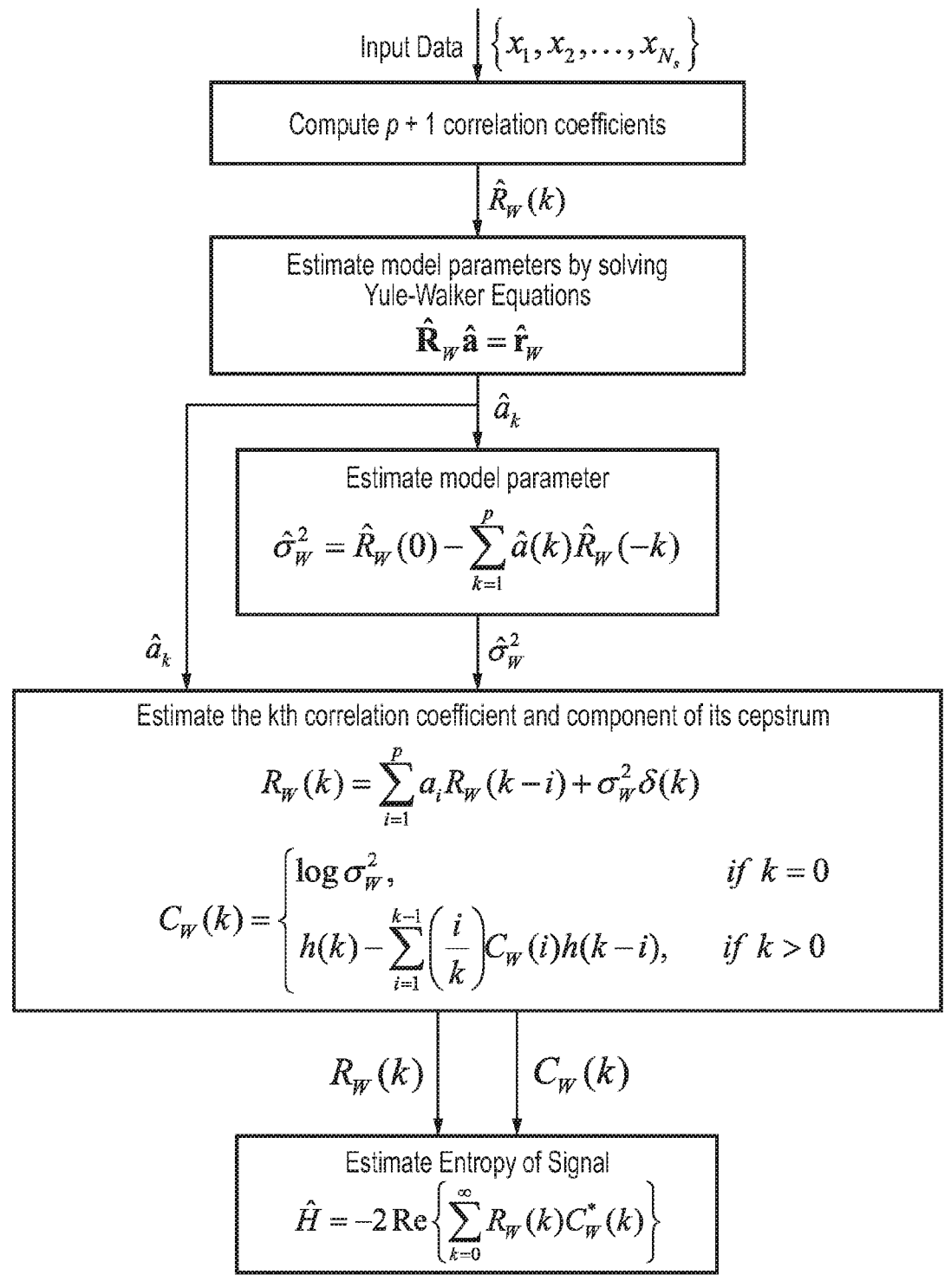
FIG. 5 is a flow chart showing an algorithm for estimating the entropy of a signal.

The overall entropy estimation procedure of an input sequence of data $\{x_1, x_2, \ldots, x_N\}$ is summarized in FIG. 5.

Practical Issues in the Entropy Estimation

In practice, modeling a PDF accurately using the AR technique requires a long AR model, i.e., large number of AR coefficients. It is well known from spectral estimation theory that too low a model order will produce inadequate resolution which yields to estimator bias, and a high model order results in loss of stability of the estimate which produces spurious peaks, i.e. large variance [3, 10]. To address the long AR model problem, the AR parameters can be obtained as a regularized least-squares solution [3, 12]

$$\hat{a} = \left(\hat{R}_W + \lambda\Gamma_k\right)^{-1}\hat{r}_W \tag{27}$$

where $\Gamma_k$ is the diagonal matrix with elements $[\Gamma_k]_{ii}=i^{2k}$ incorporating the prior knowledge about the "smoothness"

of the spectrum (see [12] for further details). The parameter A is a hyperparameter that balances a fidelity to the data and a smoothness prior [12]. A selection rule for λ has been derived in [12, 13] which minimizes the following marginal likelihood $$L(\lambda) = \log(\det(\hat{R}_W + \lambda\Gamma_k)) - p\log\lambda - N\log(\sigma_W^2) \qquad (28)$$

where $$\sigma_W^2$$

ensures that the AR probability distribution is properly normalized.

Recursive Algorithm for Entropy Estimation

Most of the entropy estimation equations above can be computed recursively. The correlation sequence in (17) can be estimated recursively by $$R_W^{N_s}(k) = \frac{1}{N_s}\sum_{n=0}^{N_s} e^{j2\pi kx(n)} = \frac{N_s - 1}{N_s} R_W^{N_s-1}(k) + \frac{1}{N_s} e^{j2\pi kx(N_s)}. \qquad (29)$$

Adaptive entropy estimation can be done by recursively computing the autocorrelation matrix [3]

$$\hat{R}_W^{n+1} = \frac{1}{n+1}\left[n\mu\hat{R}_W^{(n)} + \zeta(n+1)\zeta(n+1)^T\right] \qquad (30)$$

where μ is a forgetting factor and $\zeta(n+1)^T = [e^{-j(x_{n+1}+\varphi)}, \ldots, e^{-j(px_{n+1}+\varphi)}]$. The AR parameters can also be recursively computed, which avoids matrix inversion required in (27). The recursive regularized least squares solution can be computed using a gradient approach [3]

$$\hat{a}^{(n+1)} = \hat{a}^n + \beta\left(\hat{R}_W^{(n)} + \lambda\Gamma_k\right)\hat{a}^{(n)} - \hat{r}_W^{(n)}. \qquad (31)$$

At each stage, after updating the autocorrelation function and computing the recursive model parameters, equations (23)-(25) can be used to compute the entropy recursively.

Location Validation Using the Entropy of the Measurement Residuals

After system setup and when the AP locations are precisely known and recorded, each AP, $AP_j$ generates a sequence of measurement residuals $\varepsilon_{1j}$ relative to the anchor $AP_1$ to obtain the corresponding vector $E_{1j}$. The entropy estimate is calculated from the elements of this vector of residuals $EE_{1j}$ for the pair $AP_1$ and $AP_j$, to obtain the entropy value $\hat{H}_{\varepsilon,1j}$. This entropy estimate is a representative metric for the ranging between $AP_j$ and $AP_1$.

Periodically, in the system operations phase (for example, once a day), a vector $GE_{1j}$ of measurement residuals $\gamma E_{1j}$ is captured for $AP_j$ relative to the anchor $AP_1$. The entropy estimate is calculated from the elements of each vector $GE_{1j}$ to obtain an entropy value $\hat{H}_{\gamma,1j}$ which again is a representative metric for the ranging between $AP_j$ and $AP_1$ in the system operations phase.

From the entropy values calculated above, we define the following validity metric:

If $|\hat{H}_{\gamma,1,a} - \hat{H}_{\varepsilon,1,a}| \geq \theta$, then the position of $AP_{j=a}(x_a, y_p)$ has changed, (32)

where θ is a prescribed entropy tolerance for the location system.

The systems and methods of the above embodiments may be implemented in a computer system (in particular in computer hardware or in computer software) in addition to the structural components and user interactions described.

The term "computer system" includes the hardware, software and data storage devices for embodying a system or carrying out a method according to the above described embodiments. For example, a computer system may comprise a central processing unit (CPU), input means, output means and data storage. Preferably the computer system has a monitor to provide a visual output display. The data storage may comprise RAM, disk drives or other computer readable media. The computer system may include a plurality of computing devices connected by a network and able to communicate with each other over that network.

The methods of the above embodiments may be provided as computer programs or as computer program products or computer readable media carrying a computer program which is arranged, when run on a computer, to perform the method(s) described above.

The term "computer readable media" includes, without limitation, any non-transitory medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

In particular, although the methods of the above embodiments have been described as being implemented on the systems of the embodiments described, the methods and systems of the present invention need not be implemented in conjunction with each other, but can be implemented on alternative systems or using alternative methods respectively.

REFERENCES

[1]. IEEE Standard for a Precision Clock Synchronization Protocol for Networked Measurement and Control Systems, IEEE 1588-2008.

[2]. C. E. Shannon, "A mathematical theory of communication," Bell Syst. Tech. J., vol. 27, pp. 379-423; 623-656, July/October 1948 [Online] Available http://cm.bell-labs.com/cm/ms/what/shannonday/paper.html.

[3]. J.-F. Bercher, C. Vigant, "Estimating the entropy of a signal with applications", IEEE Trans. on Signal Processing, vol. 48, no. 6, pp. 1687-1694, June 2000.

[4]. R. Moddemeijer, "On estimation of entropy and mutual information of continuous distributions," Signal Processing, vol. 16, no. 3, pp. 233-246, 1989.

[5]. P. Hall and S. Morton, "On the estimation of entropy," Ann. Inst. Stat. Math., vol. 45, pp. 69-88, 1993.

[6]. O. Vasicek, "A test of normality based on sample entropy," *J. R. Stat. Soc. Ser. B*, vol. 38, pp. 54-59, 1976.

[7]. J. C. Correa, "A new estimator of entropy," *Commun. Stat.-Theory Methodol.*, vol. 24, pp. 2439-2449, 1995.

[8]. P. Viola, N. N. Schraudolph and T. J. Sejnowski, "Empirical entropy manipulation for real-world problems," in *Advances in Neural Information Processing Systems* 8. Cambridge, MA: MIT Press, 1996.

[9]. D. T. Pham, "Blind separation of instantaneous mixture of sources via an independent component analysis," *IEEE Trans. Signal Processing*, vol. 44, pp. 2768-2779, November 1996.

[10]. S. Kay, "Model-based probability density function estimation," *IEEE Signal Processing Letters*, vol. 5, no. 12, December 1998.

[11]. M. H. Hayes, *Statistical Digital Signal Processing and Modeling*, John Wiley & Sons, Inc., 1996.

[12]. G. Kitagawa and W. Gersh, "A smoothness priors long AR model method for spectral estimation," *IEEE Trans. Automat. Contrl.*, vol. AC-30, pp. 57-65, 1985.

[13]. J.-F. Giovannelli, G. Demoment and A. Herment, "A Bayesian method for long AR spectra estimation: A Comparative study," *IEEE Trans. Ultrason. Freq. Ferroelect.*, vol. 43, pp. 220-233, March 1996.

[14]. James Aweya, Nayef Al Sindi, and Kin Poon, "Method and System for Localization", U.S. Pat. No. 8,880,105, Nov. 14, 2014.

All references referred to above are hereby incorporated by reference.

The invention claimed is:

1. A method of determining whether the location of a first one of a plurality of reference points used in a location system has changed, the reference points each having a known initial position, the method including the steps of:
   sending a wireless message between a second reference point and the first reference point and recording the times of sending and receipt of the wireless message;
   estimating, from the recorded times, an estimated distance between the first reference point and the second reference point;
   comparing the estimated distance to the actual distance between the known initial positions of the first and second reference points to determine a measurement residual; and
   determining, using the measurement residual, whether the location of the first reference point has changed;
   wherein the step of determining includes comparing the measurement residual or residuals to a pre-determined measurement residual for a message sent between the first and second reference points when they are at their initial positions.

2. The method of claim 1 wherein the steps of sending, estimating and comparing are performed a plurality of times and the step of determining uses all of the determined measurement residuals.

3. The method of claim 2 wherein the step of determining uses an average of the determined measurement residuals.

4. The method of claim 3, wherein the step of determining includes:
   comparing the measurement residual or residuals to a pre-determined measurement residual for a message sent between the first and second reference points when they are at their initial positions; and
   comparing the average of the determined measurement residuals to an average of a plurality of pre-determined measurement residuals for a plurality of messages sent between the first and second reference points when they are at their initial positions.

5. The method of claim 1 wherein the location of the first reference point is determined to have changed if the measurement residual or residuals differs from the pre-determined measurement residual by more than a pre-determined amount.

6. The method of claim 1, further including the steps of:
   sending a wireless message between a plurality of other reference points and the first reference point and recording the times of sending and receipt of the wireless message; and
   for each of the plurality of other reference points:
      estimating, from the recorded times, an estimated distance between the first reference point and the other reference point;
      comparing the estimated distance to the actual distance between the known initial positions of the first reference point and the other reference point to determine a measurement residual,
   wherein the step of determining uses all of the determined measurement residuals.

7. The method of claim 1 wherein the step of determining includes estimating the entropy of the measurement residual or residuals.

8. The method of claim 7 further including the step of estimating the entropy of a plurality of pre-determined measurement residuals for a plurality of messages sent between the first and second reference points when they are at their initial positions.

9. The method of claim 7 wherein the location of the first reference point is determined to have changed if the entropy of the measurement residual or residuals differs from the entropy of the plurality pre-determined measurement residuals by more than a pre-determined amount.

10. The method of claim 1 wherein the steps are performed with each of the plurality of reference points as the first reference point.

11. The method of claim 1 wherein the steps of sending, estimating, comparing and determining are performed periodically while the location system is operational.

12. A method of determining the location of a mobile device, the method including the mobile device exchanging wireless messages with a plurality of reference points having known initial positions and determining the location of the mobile device from the timing of the sending and receiving of said messages, wherein the method further includes determining whether the location of any of the reference points has changed using a method according to claim 1.

13. The method of claim 12 wherein, when determining the location of the mobile device, the method does not use any reference point whose location is determined to have changed.

14. A location system having a plurality of reference points each having a known initial position and arranged to exchange wireless messages with a mobile device to determine the location of the mobile device, the system including a processor which is arranged to:
   estimate from the recorded times of sending and receipt of a wireless message between a second reference point and a first reference point, an estimated distance between the first reference point and the second reference point;
   compare the estimated distance to the actual distance between the known initial positions of the first and second reference points to determine a measurement residual; and determine, using the measurement residual, whether the location of the first reference point has changed;

wherein the processor is arranged to determine whether the location of the first reference point has changed by comparing the measurement residual or residuals to a pre-determined measurement residual for a message sent between the first and second reference points when they are at their initial positions.

15. The location system of claim 14 wherein, if the location of the first reference point is determined to have changed, the system is arranged not to use that reference point in subsequent location determinations.

16. The location system of claim 15 wherein the processor is arranged to perform the steps of estimating and comparing a plurality of times and to use all of the determined measurement residuals in determining whether the location of the first reference point has changed.

17. The location system of claim 16 wherein the processor is arranged to determine whether the location of the first reference point has changed using an average of the determined measurement residuals.

18. The location system of claim 17, wherein the processor is arranged to determine whether the location of the first reference point has changed by:

comparing the measurement residual or residuals to a pre-determined measurement residual for a message sent between the first and second reference points when they are at their initial positions; and comparing the average of the determined measurement residuals to an average of a plurality of pre-determined measurement residuals for a plurality of messages sent between the first and second reference points when they are at their initial positions.

19. The location system of claim 14 wherein the processor is arranged to determine that the location of the first reference point if the measurement residual or residuals differs from the pre-determined measurement residual by more than a pre-determined amount.

20. The location system of claim 14, wherein the processor is further arranged to:

for each of a plurality of other reference points in the system:

estimate, from the recorded times of sending and receipt of wireless messages sent between the other reference point and the first reference point, an estimated distance between the first reference point and the other reference point;

compare the estimated distance to the actual distance between the known initial positions of the first reference point and the other reference point to determine a measurement residual, and to determine whether the location of the first reference point has changed using all of the determined measurement residuals.

21. The location system of claim 14 wherein the processor is arranged to estimate the entropy of the measurement residual or residuals and to determine whether the location of the first reference point has changed using said estimated entropy.

22. The location system of claim 21 further wherein the processor is arranged to estimate the entropy of a plurality of pre-determined measurement residuals for a plurality of messages sent between the first and second reference points when they are at their initial positions.

23. The location system of claim 21 wherein the processor is arranged to determine that the location of the first reference point has changed if the entropy of the measurement residual or residuals differs from the entropy of the plurality pre-determined measurement residuals by more than a pre-determined amount.

24. The location system of claim 14 wherein the processor is arranged to determine, from wireless messages sent and received by a plurality of said reference points, whether the location of any of said plurality of reference points have changed by performing the steps of estimating, comparing and determining for each of said plurality of reference points.

25. The location system of claim 14 wherein each reference point has a processor which is arranged to determine, from the measurement residuals determined for messages sent by or received by that reference point, whether the location of that reference point has changed.

26. The location system of claim 14 wherein the processor is arranged to perform the steps of estimating, comparing and determining periodically while the location system is operational.

\* \* \* \* \*